US009971455B2

(12) United States Patent
Nishioka

(10) Patent No.: US 9,971,455 B2
(45) Date of Patent: May 15, 2018

(54) SPATIAL COORDINATE IDENTIFICATION DEVICE

(71) Applicant: Funai Electric Co., Ltd., Osaka (JP)

(72) Inventor: Ken Nishioka, Kawachinagano (JP)

(73) Assignee: Funai Electric Co., Ltd., Osaka (JP)

( * ) Notice: Subject to any disclaimer, the term of this patent is extended or adjusted under 35 U.S.C. 154(b) by 782 days.

(21) Appl. No.: 14/481,391

(22) Filed: Sep. 9, 2014

(65) Prior Publication Data

US 2015/0077399 A1 Mar. 19, 2015

(30) Foreign Application Priority Data

Sep. 17, 2013 (JP) ................................ 2013-192073

(51) Int. Cl.
| | |
|---|---|
| G09G 5/00 | (2006.01) |
| G06F 3/042 | (2006.01) |
| G02B 27/22 | (2018.01) |
| G06F 3/041 | (2006.01) |
| G06F 3/0481 | (2013.01) |

(52) U.S. Cl.
CPC ....... G06F 3/0421 (2013.01); G02B 27/2292 (2013.01); G06F 3/0416 (2013.01); G06F 3/0423 (2013.01); G06F 3/04815 (2013.01); G06F 2203/04101 (2013.01)

(58) Field of Classification Search
CPC ... G06F 3/01; G06F 3/03; G06F 3/017; G06F 3/041; G06F 3/042; G06F 3/0425; G02B 5/08; G02B 5/32; G02B 27/01; G02B 27/22; G02B 17/08; G02B 26/08; G09G 5/00; G08B 6/00; H04N 7/14; H04N 5/33;

(Continued)

(56) References Cited

U.S. PATENT DOCUMENTS

| 5,164,714 A | 11/1992 | Wehrer |
| 2002/0023960 A1* | 2/2002 | Knowles .............. G02B 26/106 235/472.01 |

(Continued)

FOREIGN PATENT DOCUMENTS

| EP | 2521057 A1 | 11/2012 |
| EP | 2790049 A1 | 10/2014 |
| WO | 2008123500 A1 | 10/2008 |

OTHER PUBLICATIONS

Extended European Search Report issued in corresponding European Application No. 14184383.9, dated Jan. 23, 2015 (8 pages).

Primary Examiner — Ilana Spar
Assistant Examiner — Nguyen H Truong
(74) Attorney, Agent, or Firm — Osha Liang LLP

(57) ABSTRACT

A spatial coordinate identification device includes a detection light source that emits a detection light that scans a detection boundary plane defined in space, an optical sensor that detects a reflected light of the detection light reflected by an indicator when the indicator enters a detection region extending from the detection boundary plane to the detection light source, and a controller. The controller stores virtual touch surface defining information that defines a position of a virtual touch surface based on the detection boundary plane, and identifies, in response to the detection of the reflected light, a position of a boundary point that is an intersecting point of the indicator and the detection boundary plane, and an approach amount by which the indicator has entered the detection region.

16 Claims, 9 Drawing Sheets

(58) Field of Classification Search
CPC ........ H04N 13/04; G03B 21/00; G03B 21/28; G01B 11/14
See application file for complete search history.

(56) References Cited

U.S. PATENT DOCUMENTS

| | | |
|---|---|---|
| 2003/0142136 A1 | 7/2003 | Carter et al. |
| 2010/0253860 A1* | 10/2010 | Nishigaki ............ G03B 21/132 348/744 |
| 2011/0033088 A1* | 2/2011 | Rekimoto ............ G06F 3/0425 382/107 |
| 2011/0205186 A1* | 8/2011 | Newton ................ G06F 3/011 345/175 |
| 2011/0285965 A1* | 11/2011 | Sugiyama ............. G03B 21/28 353/10 |
| 2011/0316679 A1* | 12/2011 | Pihlaja ............... G06F 3/04815 340/407.2 |
| 2012/0281061 A1* | 11/2012 | Tsujino ................ G02B 5/136 348/14.08 |
| 2013/0100416 A1* | 4/2013 | Shimatani .......... G02B 27/2235 353/10 |
| 2013/0155030 A1* | 6/2013 | Kawai .................. G06F 3/0428 345/175 |
| 2013/0257809 A1* | 10/2013 | Wei ..................... G06F 3/0428 345/175 |
| 2014/0253511 A1* | 9/2014 | Yagishita ............. G06F 3/0425 345/175 |
| 2016/0132185 A1* | 5/2016 | Otsubo ................. G06F 3/042 345/175 |

\* cited by examiner

[FIG. 1]
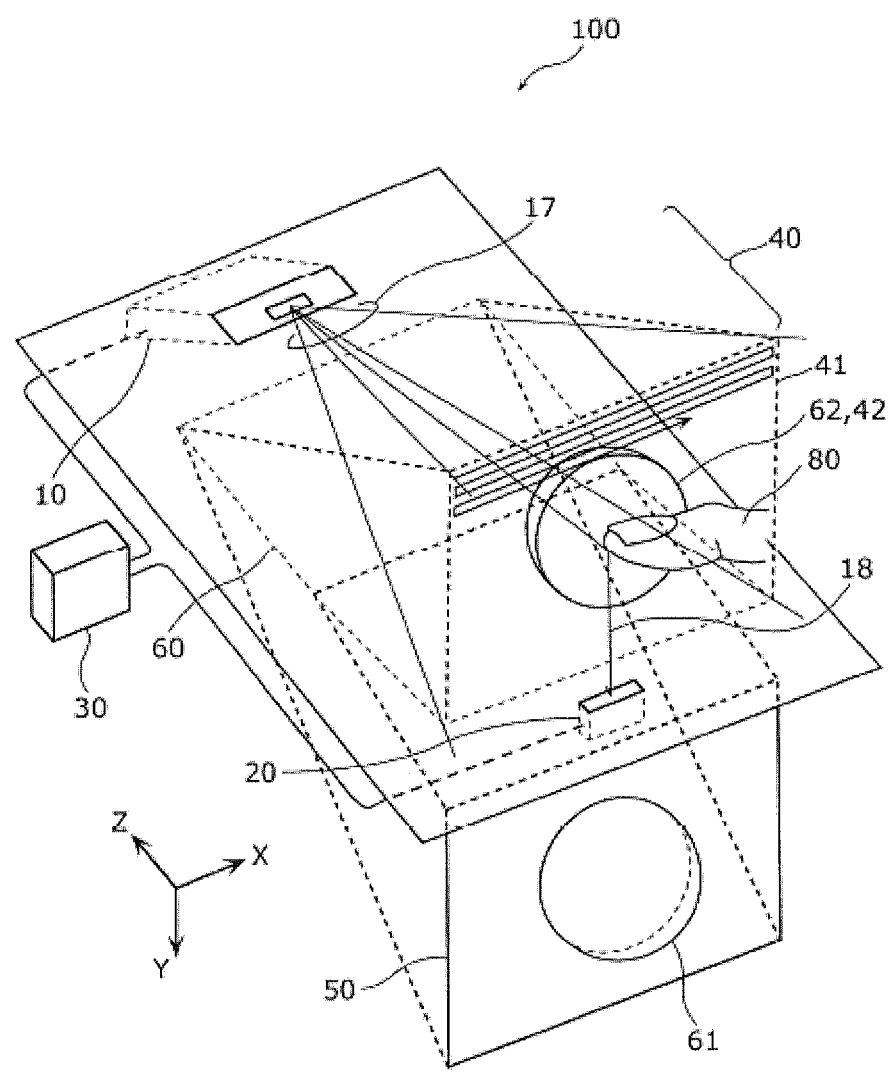

[FIG. 2]
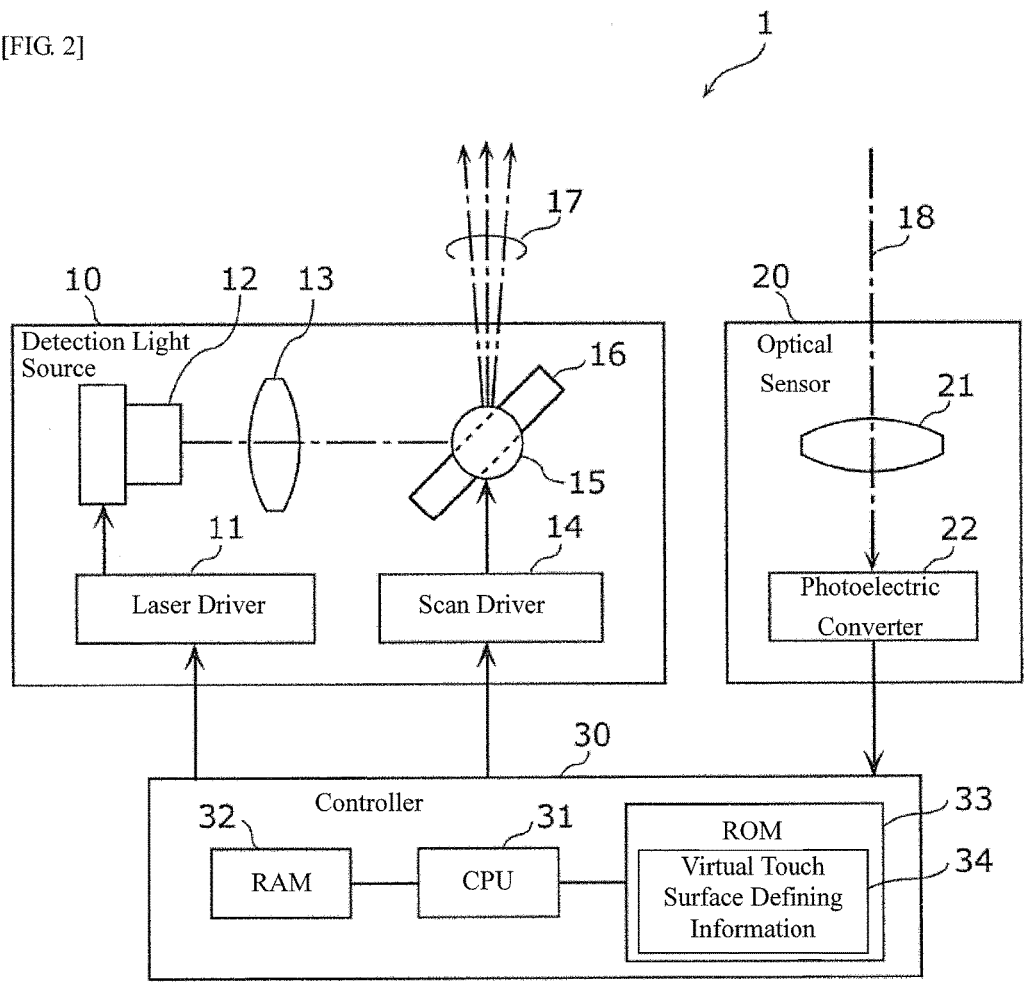

[FIG. 3]
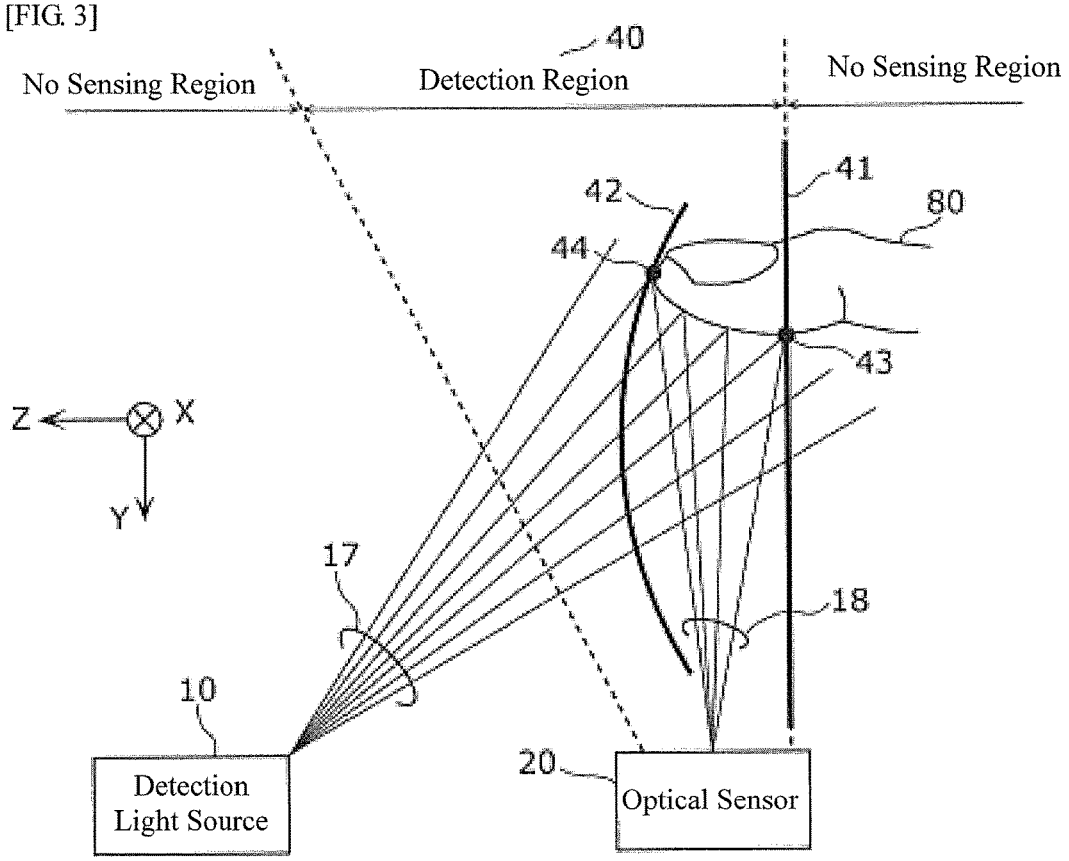
[FIG. 4]
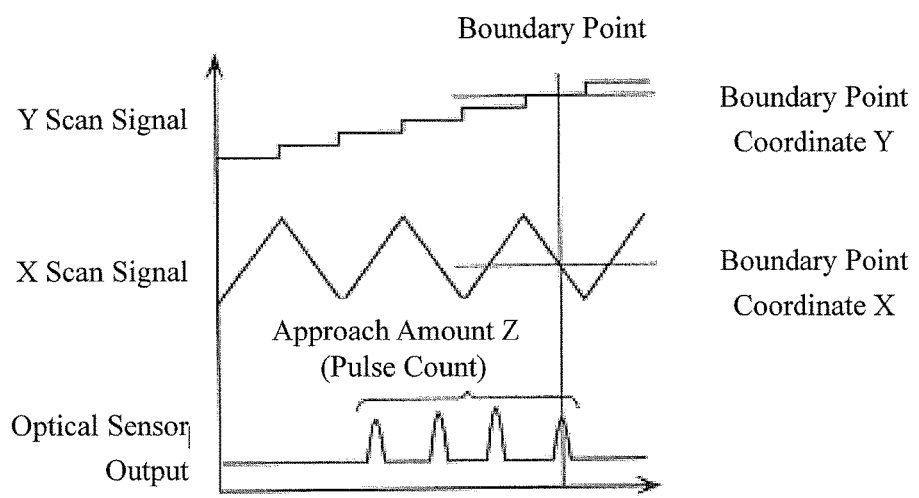

[FIG. 5]

| Detection Boundary Plane | | Virtual Touch Surface | | |
|---|---|---|---|---|
| X | Y | x | y | z |
| 0 | 0 | NA | NA | NA |
| 1 | 0 | NA | NA | NA |
| 2 | 0 | NA | NA | NA |
| ⋮ | ⋮ | ⋮ | ⋮ | ⋮ |
| 400 | 100 | 350 | 80 | 20 |
| 401 | 100 | 351 | 80 | 20 |
| 402 | 100 | 352 | 80 | 20 |
| ⋮ | ⋮ | ⋮ | ⋮ | ⋮ |

34a

NA  Touched Aerial Image Does Not Exist

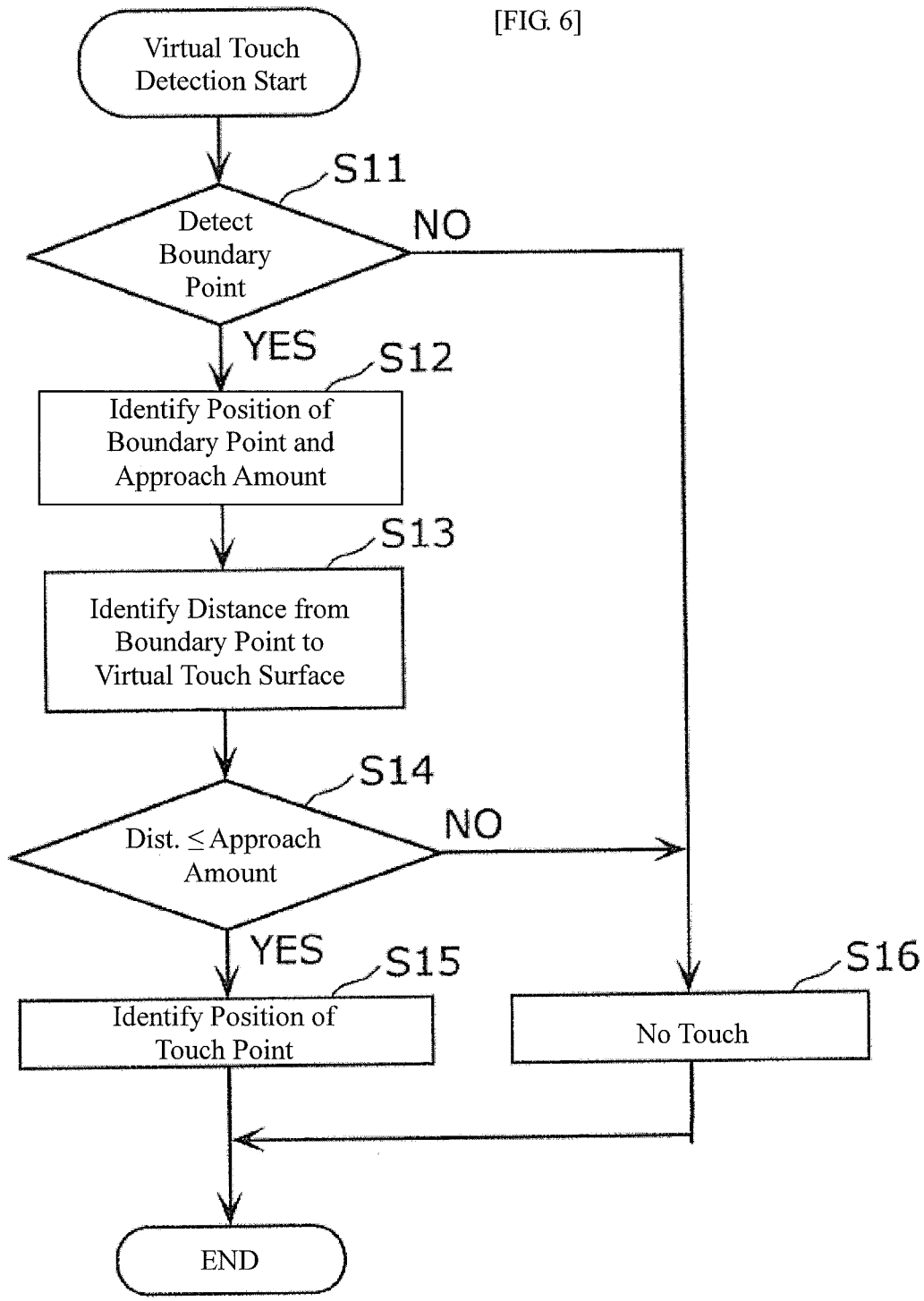
[FIG. 6]

[FIG. 7]
$$x_k = \sum_{i=0}^{n} \sum_{j=0}^{i} a_{j(i-j)} X^j Y^{i-j} \quad \ldots(a)$$
$$y_k = \sum_{i=0}^{n} \sum_{j=0}^{i} b_{j(i-j)} X^j Y^{i-j} \quad \ldots(b)$$
$$z_k = \sum_{i=0}^{n} \sum_{j=0}^{i} c_{j(i-j)} X^j Y^{i-j} \quad \ldots(c)$$
n: Order of Approximation Formula
k: Three Dimensional Identification Number
[FIG. 8]
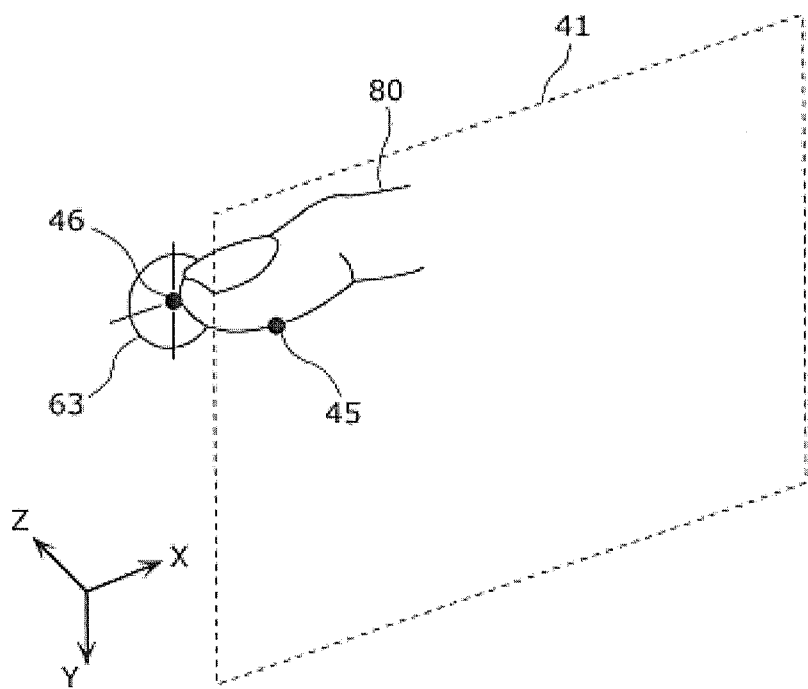

[FIG. 9A]
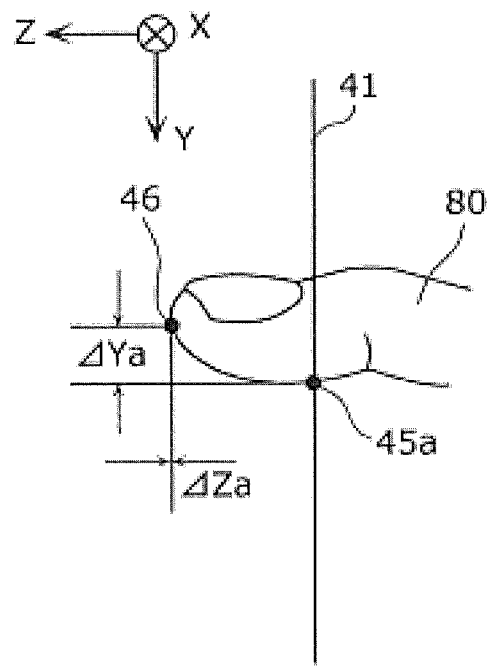
[FIG. 9B]
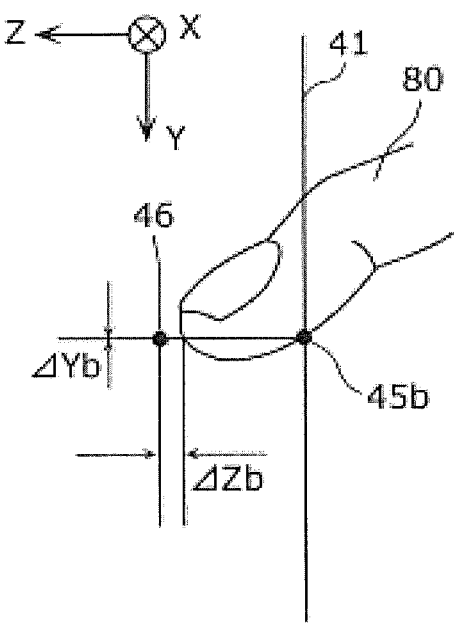

[FIG. 10]
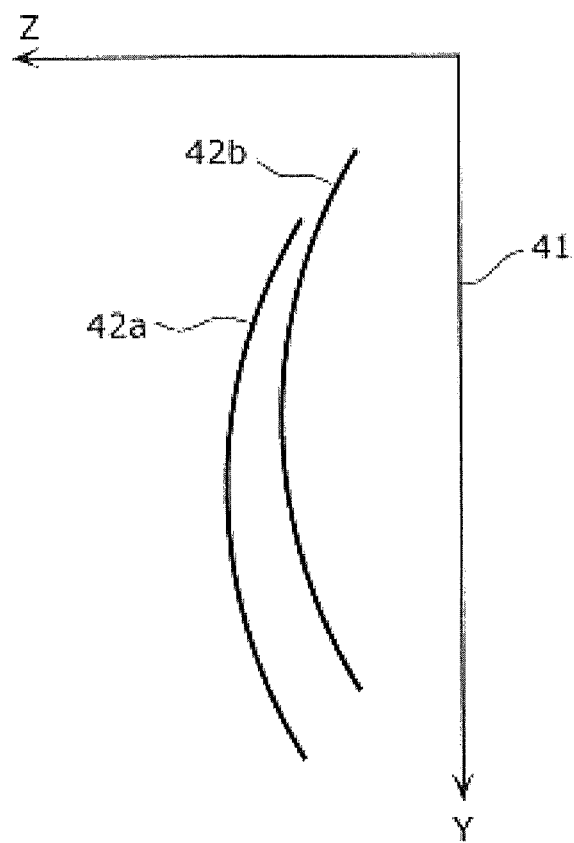

[FIG. 11]
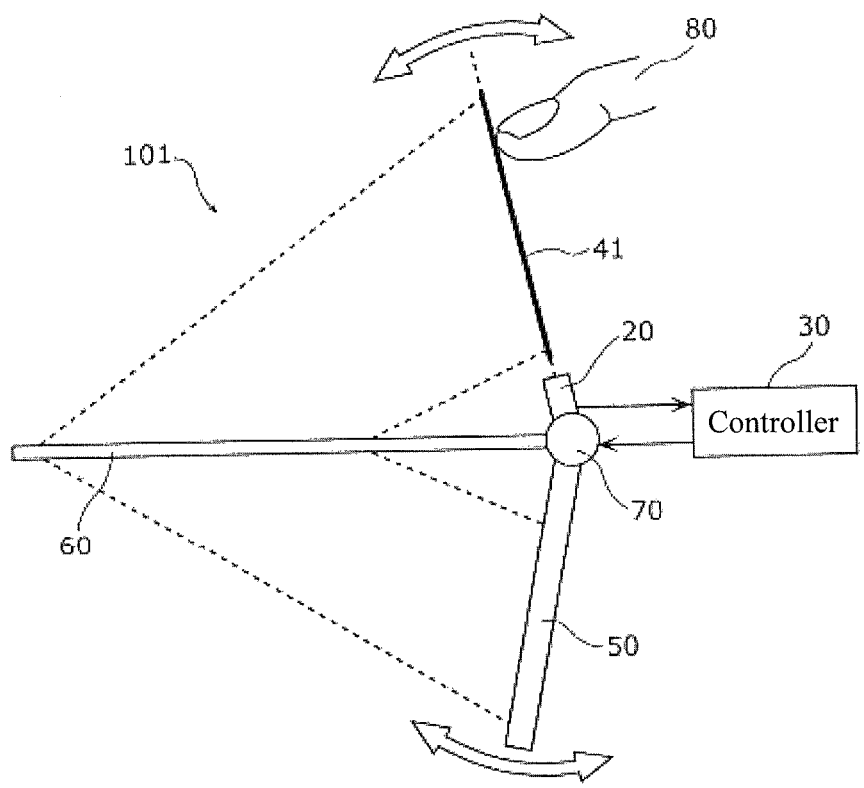

SPATIAL COORDINATE IDENTIFICATION DEVICE

TECHNICAL FIELD

The field of the invention relates to a spatial coordinate identification device, and particularly relates to a technique for detecting a virtual touch operation performed by a user relative to an aerial image formed in space.

BACKGROUND ART

A floating image interaction device is described by Patent Document 1. The device comprises an imaging optical system in which light emitted from an object to be projected disposed on one side of a beam bending plane configuring a single plane where an optical path of a light beam is bent is imaged by inverting front and back to the opposite surface side of the beam bending plane thereof. The device further comprises object identification means that identifies a position of an object brought into proximity of the floating image. The object identification means includes, for example, one or more cameras to photograph the object and an image analyzer to analyze a position of the object from the image photographed by the camera. Here, the object is an indicator such as a pen or a finger of the user that is moved by the user and brought close to the floating image.

With this type of floating image interaction device, simplification of the device can be realized, access by a user to an image can be accurately understood, and preferred interaction between a user and an image can be achieved.

RELATED ART DOCUMENTS

Patent Documents

[Patent Document 1] WO 2008/123500

A spatial coordinate identification device may be similar to the conventional floating image interaction device that can detect a virtual touch operation by a user relative to an aerial image projected in space.

With the spatial coordinate identification device, a position of an indicator brought near an aerial image may be detected using a detection light source that emits detection light and a light detector that may detect reflected light of the detection light from the indicator. With this type of configuration, while a position of an indicator may be detected using a camera and advanced software for image analysis, as is pointed out in Patent Document 1, detecting user access (i.e., a position of the indicator) three dimensionally is difficult. Therefore, for example, in a virtual touch operation into a three dimensional aerial spaces with depth, a user may experience a sense of discomfort when not obtaining an intended touch sensation.

SUMMARY OF THE INVENTION

One or more embodiments provide a spatial coordinate identification device and spatial coordinate identification method that detects a position of an indicator using a detection light source and a light detector. One or more embodiments of the spatial coordinate identification device and spatial coordinate identification method may detect the position more accurately than conventional a virtual touch operation performed by a user.

In one aspect, according to one or more embodiments, a spatial coordinate identification device may comprise: a detection light source that emits a detection light that scans a detection boundary plane defined in space; an optical sensor that detects a reflected light of the detection light reflected by an indicator when the indicator enters a detection region extending from the detection boundary plane to the detection light source; and a controller that stores virtual touch surface defining information that defines a position of a virtual touch surface based on the detection boundary plane, identifies, in response to the detection of the reflected light, a position of a boundary point that is an intersecting point of the indicator and the detection boundary plane, and an approach amount by which the indicator has entered the detection region, and determines whether the indicator has reached the virtual touch surface by comparing the approach amount with a distance from the boundary point to the virtual touch surface defined by the virtual touch surface defining information, wherein when the controller has determined that the indicator has reached the virtual touch surface, the controller may identify as a touch position a position which is on the virtual touch surface corresponding to the boundary point and is represented by the virtual touch surface defining information.

With this configuration, for example, the spatial coordinate identification device may reference a virtual touch surface defining information that discretionally defines a shape of the virtual touch surface, detect an arrival of an indicator into the virtual touch surface expressed by the virtual touch surface defining information, and identify a position of a touch point. Therefore, a virtual touch surface of an arbitrary shape that includes a curved shape can be uniformly treated by a single configuration of the spatial coordinate identification device. Further, since a virtual touch surface having an identical shape as the surface shape of the aerial image can be freely defined, a user can obtain a virtual touch sensation in relation to the aerial image of any shape without a sense of discomfort.

Further, for example, according to one or more embodiments, the detection light source may scan the detection boundary plane at a given timing using the detection light, and when the optical sensor detects one or more detection pulses during a single scan of the detection boundary plane by the detection light, the controller may identify a position of the boundary point from the timing of a first or a last detection pulse of the detection pulses, and identify the approach amount according to a number of detection pulses.

With this configuration, for example, the above effect can be obtained using only a simple software process using a detection light source, optical sensor, and a controller.

Further, for example, according to one or more embodiments, the virtual touch surface defining information may comprise a numerical table indicating a position for each of a plurality of points on the virtual touch surface corresponding to each of a plurality of points on the detection boundary plane, respectively.

With this configuration, for example, because a numerical table is used, a virtual touch surface of any shape can be accurately defined.

Further, for example, according to one or more embodiments, the virtual touch surface defining information may comprise a numerical expression showing a position of a point on the virtual touch surface corresponding to any point on the detection boundary plane.

In this configuration, for example, it is possible to reduce data amounts in the virtual touch surface defining information when accumulating data amounts in the numerical table and when a shape of a virtual touch surface can be favorably approximated by a numerical expression having a relatively low order.

In one aspect, one or more embodiments of the disclosed aerial image interaction system may comprise the spatial coordinate identification device described above and an aerial image projection device that projects an aerial image within the detection region, wherein the controller may hold the virtual touch surface defining information and information that represents a surface shape of the aerial image.

With this configuration, for example, a user can obtain a virtual touch sensation in relation to the aerial image.

Further, according to one or more embodiments, when the surface shape of the aerial image changes, the controller may change the virtual touch surface defining information to represent the surface shape of the aerial image after the change.

With this configuration, for example, in accordance with a change in the aerial image, a user can obtain a virtual touch sensation in relation to the aerial image after the change.

Further, for example, according to one or more embodiments, the controller may display a calibration icon at a given calibration point using the aerial image projection device; identify, when the indicator virtually touches the calibration icon, a position of a calibration boundary point defined as an intersecting point of the indicator and the detection boundary plane and a calibration amount defined as an amount by which the indicator has entered the detection region; and correct the virtual touch surface defining information based on the position of the calibration boundary point and the calibration amount.

With this configuration, for example, because errors in the virtual touch surface defining information that may occur due to various causes, such as a position in relation to a detection boundary plane of a user or a shape of an indicator, can be corrected, a user can obtain a virtual touch sensation in relation to the aerial image of any shape without a sense of discomfort.

Further, for example, according to one or more embodiments, the aerial image projection device may comprise: an image display panel that displays an image; and a reflective element assembled substrate that projects the image displayed on the image display panel in the detection region as the aerial image; and the aerial image interaction system further may comprise: a rotating mechanism provided on a flat surface that includes the reflective element assembled substrate that rotates the image display panel and the optical sensor in mutually opposing directions around a rotational axis so that the detection boundary plane comes to a position symmetrical with the image display panel in relation to the reflective element assembled substrate, wherein the controller may detect an approach direction of the indicator into the detection region using a difference in the position of the calibration boundary point and a position of the calibration point, and rotate the image display panel and the optical sensor according to the detected approach direction.

With this configuration, for example, because the aerial image and the virtual touch surface can be reoriented in a direction that makes it easier to view and operate by a user, user operability is improved.

These general or specific aspects may be realized by a system, method, integrated circuit, computer program, or storage medium such as a CD-ROM readable by a computer, or they may be realized by any combination of system, method, integrated circuit, computer program, or storage medium.

According to one or more embodiments, in a spatial coordinate identification device and spatial coordinate identification method that detects an indicator using a light source and a light detector, a spatial coordinate identification device and spatial coordinate identification method can detect more accurately than conventional a virtual touch operation performed by a user.

BRIEF DESCRIPTION OF DRAWINGS

FIG. 1 is a schematic drawing illustrating one example of a configuration of an aerial image interaction system according to one or more embodiments.

FIG. 2 is a block diagram illustrating one example of a functional configuration of a spatial coordinate identification device according to one or more embodiments.

FIG. 3 is a schematic drawing describing a principle of spatial coordinate detection according to one or more embodiments.

FIG. 4 is a waveform diagram illustrating one example of main signals used in spatial coordinate detection according to one or more embodiments.

FIG. 5 is a diagram illustrating one example of virtual touch surface defining information according to one or more embodiments.

FIG. 6 is a flowchart illustrating one example of a virtual touch detection operation according to one or more embodiments.

FIG. 7 is a diagram illustrating one example of virtual touch surface defining information according to one or more embodiments.

FIG. 8 is a diagram illustrating one example of a calibration icon according to one or more embodiments.

FIG. 9A is a diagram illustrating one example of a disposition detected using the calibration icon according to one or more embodiments.

FIG. 9B is a diagram illustrating one example of a disposition detected using the calibration icon according to one or more embodiments.

FIG. 10 is a diagram schematically illustrating one example of a virtual touch surface according to one or more embodiments.

FIG. 11 is a schematic drawing illustrating one example of a configuration of main parts of an aerial image interaction system according to one or more embodiments.

DETAILED DESCRIPTION OF THE EMBODIMENTS

Embodiments of the present invention are described below in detail with references to drawings.

Each of the embodiments described below represent one specific example of the present invention. The numerical values, shapes, materials, constituent elements, the disposition and modes of connection of the constituent elements, steps and sequence of steps given in the embodiments below are examples and are not intended to limit the present invention. Further, constituent elements in the following embodiments not listed in the independent claims will be described as arbitrary constituent elements.

First Example

In one or more embodiments of the first example, a description will be given of an aerial image interaction system that detects a virtual touch operation of a user relative to the aerial image projected in space.

FIG. 1 is a schematic diagram illustrating one example of a configuration of an aerial image interaction system 100.

As illustrated in FIG. 1, the aerial image interaction system 100 may comprise a detection light source 10, an optical sensor 20, a controller 30, an image display panel 50, and a reflective element assembled substrate 60. The detection light source 10, optical sensor 20, and controller 30 configure a spatial coordinate identification device 1. The image display panel 50 and the reflective element assembled substrate 60 configure an aerial image projection device.

The detection light source 10 emits, e.g., a detection light 17 that may scan a detection boundary plane 41 defined in midair. The detection light 17 may be, for example, a collimated beam of an infrared laser.

The optical sensor 20 may detect a reflected light 18 from an indicator 80 when the indicator 80 has approached into the defined detection region 40 from the detection boundary plane 41 to the detection light source 10. The indicator 80 may be, for example, a finger of the user or a pen held and moved by the hand of the user. A virtual touch surface 42, virtually touched by the indicator 80, may be defined as the area within the detection area 40.

The controller 30 may detect the virtual touch operation of the indicator 80 relative to the virtual touch surface 42 and may identify the position of the touch point 44.

The image display panel 50 is a panel that displays, e.g., an image 61. The image display panel 50 may be, for example, a liquid crystal display panel. The image 61 may be, for example, an image object highly shadow-processed and given a true stereoscopic effect. In the present specification, a fishbowl-shaped image object is illustrated as the image 61 for simplicity in description and illustration.

The reflective element assembled substrate 60 is an optical element that may project the image 61 displayed on the image display panel 50 as an aerial image 62 in the detection region 40. The reflective element assembled substrate 60 may be, for example, a two-faced corner reflector array as disclosed in Patent Document 1. A depth-inverted real image of the image 61 may be imaged in the detection region 40 as the aerial image 62 by the reflective element assembled substrate 60. Defining in the controller 30 the virtual touch surface 42 to have the same shape as the surface shape of the aerial image 62 allows, for example, the user to obtain a virtual touch sensation relative to the aerial image 62.

Next, a configuration of the spatial coordinate identification device 1 will be described.

FIG. 2 is a block diagram illustrating one example of a functional configuration of the spatial coordinate identification device 1.

As illustrated in FIG. 2, the detection light source 10 may comprise a laser driver 11, an infrared laser element 12, a collimated lens 13, a scan driver 14, an actuator 15, and a mirror 16.

The laser driver 11 may drive the infrared laser element 12 under the control of the controller 30. The infrared laser element 12 may emit an infrared laser light as the detection light 17. The collimated lens 13 may convert the infrared laser light incident from the infrared laser element 12 into parallel light.

The scan driver 14 may drive the actuator 15 under the control of the controller 30. The actuator 15, by changing the direction of the mirror 16, may perform raster scan for the detection boundary plane 41 using the detection light 17 reflected by the mirror 16. As illustrated in FIG. 1, the raster scan of the detection boundary plane 41 may be configured of a primary scan scanning in the X direction and a secondary scan scanning the Y direction of the detection boundary plane 41 using the detection light 17.

The optical sensor 20 may comprise a condensing lens 21 and a photoelectric converter element 22.

The condensing lens 21 may condense the reflected light 18 from the indicator 80 of the detection light 17 to the photoelectric converter element 22, and the photoelectric converter element 22 may convert the reflected light 18 incident through the condensing lens 21 into a detection signal.

The controller 30 is a controller that may hold virtual touch surface defining information 34 which expresses the position of the virtual touch surface 42 using the detection boundary plane 41 as a reference, detect a virtual touch operation by the indicator 80 onto the virtual touch surface 42, and identify the touch position on the virtual touch surface 42.

The controller 30, for example, may be configured as a computer system made up of a central processing unit (CPU) 31, random access memory (RAM) 32, read only memory (ROM) 33 and the like. Part or all of the functions of the controller 30 may be accomplished by the CPU 31 executing a program (not illustrated) recorded in the ROM 33 using the RAM 32 as working memory. Further, part or all of the functions of the controller 30 may be achieved by dedicated hardware circuitry. The virtual touch surface defining information 34 may be kept in the ROM 33.

Next, the principle of spatial coordinate detection by the spatial coordinate identification device 1 will be described.

FIG. 3 is a schematic diagram describing the principle of spatial coordinate detection by the spatial coordinate identification device 1. FIG. 3 corresponds to a diagram of the schematic diagram of FIG. 1 viewed from the X direction.

FIG. 4 is a waveform diagram illustrating one example of a main signal used in spatial coordinate detection by the spatial coordinate identification device 1.

As illustrated in FIG. 3, the optical sensor 20 may detect the reflected light 18 from the indicator 80 of the detection light 17 when the indicator 80 has entered the defined detection region 40 from the detection boundary plane 41 to the detection light source 10. The optical sensor 20 may not detect the reflected light 18 reflected to the indicator 80 in a non-sensing region outside the detection region 40.

As illustrated in FIG. 4, the controller 30 supplies a Y scan signal, which may designate the Y-direction scan position by level, and an X scan signal, which may designate the X-direction scan position by level, to the scan driver 14. For example, the Y scan signal may be an increasing staircase wave, and the X scan signal may be a triangular wave.

With this type of Y scan signal and X scan signal, the actuator 15 may adjust the direction of the mirror 16 so that the detection light 17 performs raster scans for the detection boundary plane 41 in a zigzag manner, as illustrated in FIG. 1.

During a single raster scan of the detection boundary plane 41 by the detection light 17, when for example, as illustrated in FIG. 3, the reflected light 18 from the indicator 80 in the detection region 40 is detected by the optical sensor 20, four detection pulses may be outputted as an optical sensor output as illustrated in FIG. 4.

As understood from FIG. 3, the last detection pulse of the four detection pulses may correspond to the reflected light 18 from a boundary point 43 which is an intersecting point of the indicator 80 and the detection boundary plane 41, and the number of detection pulses may correspond to an "approach amount," e.g., the amount that the indicator 80 approaches into the detection region 40.

The controller 30 may identify the level of the Y scan signal and the level of the X scan signal at the time the last detection pulse is obtained as the Y coordinate value and the X coordinate value of the boundary point 43, respectively, and identify the number of detection pulses as the approach amount that the indicator 80 has approached into the detection region 40.

When a raster scan is performed using a decreasing staircase wave as the Y scan signal, the first detection pulse may correspond to the reflected light 18 from the boundary point 43. In this case, the controller 30 may identify the level of the Y scan signal and the level of the X scan signal at the time the first detection pulse is obtained as the Y coordinate value and X coordinate value of the boundary point 43, respectively.

Next, a virtual touch detection operation by the spatial coordinate identification device 1 is described.

FIG. 5 is a table showing one example of the virtual touch surface defining information 34. As shown in FIG. 5, the virtual touch surface defining information 34 may be, for example, a numerical table 34a showing the positions of points on the virtual touch surface 42 corresponding to each of the plurality of points on the detection boundary plane 41. In the numerical table 34a, x and y express the X and Y coordinates for points on the virtual touch surface 42 as viewed by the user corresponding to the point (X,Y) on the detection boundary plane 41, and z expresses a distance from the point (X,Y) on the detection boundary plane 41 to the virtual touch surface 42.

FIG. 6 is a flow chart showing an example of a virtual touch detection operation by the spatial coordinate identification device 1.

The controller 30, as described in FIG. 3 and FIG. 4, may scan the detection boundary plane 41 with the detection light 17 by controlling the detection light source 10.

If one or more detection pulses are obtained from the optical sensor 20 during a single scan of the detection boundary plane 41 by detection light 17 (YES at S11), the controller 30 may identify the positions X and Y of the boundary point 43 from the level of the X scan signal and the level of the Y scan signal at the time the first or the last detection pulse of the detection pulses is obtained, identify the approach amount Z from the number of the detection pulses (S12), reference the virtual touch surface defining information 34, and identify the distance z from the boundary point 43 to the virtual touch surface 42 (S13).

If distance z≤approach amount Z (YES at S14), the controller 30 may determine that the indicator 80 has reached the virtual touch surface 42, reference the virtual touch surface defining information 34, and identify the XY coordinates (x, y) of the point on the virtual touch surface 42 corresponding to the boundary point 43 as the position of the touch point 44 (S15).

Meanwhile, if distance z>approach amount Z (NO at S14), the controller 30 may determine that the indicator 80 has not reached the virtual touch surface 42 (S16).

By this configuration, the spatial coordinate identification device 1 may reference the virtual touch surface defining information 34, which arbitrarily defines the shape of the virtual touch surface 42, detect the arrival of the indicator 80 at the virtual touch surface 42 shown by the virtual touch surface defining information 34, and identify the position of the touch point 44.

Therefore, the virtual touch surface in any shape, including curved shapes, can be treated uniformly, as a single configuration of the spatial coordinate identification device 1. Also, because the virtual touch surface 42 with the same shape as the surface shape of the aerial image 62 can be defined freely, the user is able to obtain a virtual touch sensation in relation to the aerial image 62 for any shape without a sense of discomfort.

The controller 30 may hold a plurality of virtual touch surface defining information 34 corresponding to respectively different stereoscopic images, and, for moving stereoscopic images, the virtual touch surface defining information 34 may be modified according to the movement of the stereoscopic image.

Second Example

Above, an example of the virtual touch surface defining information 34 shown in the numerical table 34a is described, but the virtual touch surface defining information 34 is not limited the numerical table 34a.

FIG. 7 is a figure showing another example of the virtual touch surface defining information 34. As shown in FIG. 7, the virtual touch surface defining information 34 may be, for example, a numerical expression 34b showing a position of the point on the virtual touch surface 42 corresponding to any point on the detection boundary plane 41.

In the numerical expression 34b, $x_k$ and $y_k$ express approximate values of the X and Y coordinates of a point on the virtual touch surface 42 visible as viewed by the user corresponding to a point (X, Y) on the detection boundary plane 41, and $z_k$ expresses an approximate value of the distance from the point (X, Y) on the detection boundary plane 41 to the virtual touch surface 42. Here, $x_k$, $y_k$, and $z_k$ may be defined corresponding to a plurality of stereoscopic images k, respectively.

For example, when the amount of the data in the numerical table 34a is piled up, or when the shape of the virtual touch surface 42 can be favorably approximated with a relatively low degree of the numerical expression 34b, such configuration is advantageous for reducing the amount of data of the virtual touch surface defining information 34.

Third Example

Above, the point viewed by the user on the virtual touch surface 42 corresponding to a point on the detection boundary plane 41 defined by the virtual touch surface defining information 34 is described. The point seen by the user on the virtual touch surface 42 corresponding to a point on the detection boundary plane 41 may change, for example, for various factors such as the position of the user related to the detection boundary plane 41 or the shape of the indicator 80. Therefore, the virtual touch surface defining information 34 may be corrected.

Below, the correction of the virtual touch surface defining information 34 is described.

FIG. 8 is a diagram illustrating one example of a calibration icon used in correcting the virtual touch surface defining information 34.

The controller 30 of the spatial coordinate identification device 1, by controlling the image display panel 50, may display a calibration icon 63 at a given calibration point 46 and prompts the user to perform a virtual touch with the indicator 80 in relation to the displayed calibration icon 63.

The controller 30 may identify the position of a calibration boundary point 45, which is the intersecting point of the indicator 80 and the detection boundary plane 41, and the calibration amount, which is the amount the indicator 80 approaches into the detection region 40, at the time the indicator 80 virtually touches the calibration icon 63.

FIG. 9A and FIG. 9B are diagrams illustrating one example of a possible disposition of the indicator 80, the detection boundary plane 41, a calibration boundary points 45a and 45b, and the calibration point 46.

FIG. 9A illustrates an example of when the user approaches the indicator 80 into the detection boundary plane 41 from a position substantially in front of the detection boundary plane 41. In the example illustrated in FIG. 9A, the Y coordinate of the calibration boundary point 45a is larger than the Y coordinate of the calibration point 46 by $\Delta Ya$, and the calibration amount substantially matches the Z coordinate of the calibration point 46 ($\Delta Za$ is substantially 0).

FIG. 9B illustrates an example of when the user approaches the indicator 80 into the detection boundary plane 41 from a position looking down on the detection boundary plane 41. In the example illustrated in FIG. 9B, the Y coordinate of the calibration boundary point 45b substantially matches the Y coordinate of the calibration point 46, ($\Delta Yb$ is substantially 0), and the approach amount Zb is smaller than the Z coordinate of the calibration point 46 by $\Delta Zb$.

Here, for example, the controller 30 may hold the virtual touch surface defining information 34 assuming the disposition illustrated in FIG. 9A. At this time, when the disposition of FIG. 9A is identified in the virtual touch of the indicator 80 on the calibration icon 63, it is assumed that the user touches the virtual touch surface 42 in the position assumed by the virtual touch surface defining information 34. Therefore, the virtual touch surface defining information 34 is used as is with no correction.

On the other hand, when the arrangement of FIG. 9B is identified, it is understood that the user sees a point shown with a Y coordinate larger by $\Delta Ya$ and a Z coordinate smaller by $\Delta Zb$ than the case of FIG. 9A corresponding to identical boundary points. Therefore, the virtual touch surface defining information 34 is used to correct the coordinate values to express $\Delta Ya$ larger at the Y coordinate and $\Delta Zb$ smaller at the Z coordinate.

FIG. 10 is a diagram conceptually showing different virtual touch surfaces 42a and 42b for when the virtual touch surface defining information 34 is corrected and when it is not corrected.

Although omitted in the illustration and description, the displacement between the calibration boundary point 45 and the calibration point 46 may be identified in the same manner for the X coordinate as the Y coordinate, and the correction of the virtual touch surface defining information 34 may be performed. The displacement in the X coordinates and Y coordinates of the calibration boundary point 45 and the calibration point 46 may be aggregated and expressed as a three-dimensional angle. The direction displaced by the three-dimensional angle corresponding to the displacement in the X coordinate and the displacement in the Y coordinate from the direction orthogonal to the detection boundary plane 41 may be defined as the approach angle of the indicator 80.

As mentioned above, with the current disposition identification identifying the position of the calibration boundary point 45 and the calibration amount using the calibration icon, the virtual touch surface defining information 34 may be corrected according to the displacement between the identified current disposition and the disposition assumed by the virtual touch surface defining information 34.

As a result, the user can obtain a virtual touch sensation in relation to the aerial image 62 without a sense of discomfort regardless of the approach angle of the indicator 80.

This type of correction process of the virtual touch panel defining information 34 may be performed, for example, when the user starts an interaction operation toward the spatial image.

Fourth Example

In the aerial image interaction system 100, the visibility of the aerial image 62, and the ease of the virtual touch operation related to the virtual touch surface 42 may differ according to the position of the user in relation to the aerial image 62 and the virtual touch surface 42. Therefore, the aerial image 62 and the virtual touch surface 42 may be reoriented in a direction that makes it easier for the user to see and operate, based on the displacement between the calibration boundary point 45 and the calibration point 46 (defined as the approach angle of the indicator 80).

Below, an aerial image interaction system 101 that can change the disposition of the image display panel 50 and the detection boundary plane 41 based on the approach angle of the identified indicator 80 using the calibration icon 63 is described. The disposition of the detection boundary plane 41 may be changed by changing the disposition of the optical sensor 20.

FIG. 11 is a schematic diagram illustrating one example of a configuration of the main parts of the aerial image interaction system 101. Further, relative to the aerial image interaction system 100, in the aerial image interaction system 101, a rotating mechanism 70 may be added that rotates the image display panel 50 and the optical sensor 20 in mutually opposing directions around a rotational axis and is provided on a flat surface that includes the reflective element assembled substrate 60. The rotating mechanism 70, under the control of the controller 30, may rotate the image display panel 50 and the optical sensor 20 so that the detection boundary plane 41 comes into a position symmetrical to the image display panel 50 relative to the reflective element assembled substrate 60.

For example, when the disposition illustrated in FIG. 9A is a disposition that makes the aerial image 62 easily seen and the virtual touch operation relative to the virtual touch surface 42 easily performed by the user, the controller 30 may hold in advance the approach angle of the identified indicator 80 in the disposition of FIG. 9A.

In the virtual touch toward the calibration icon 63 by the indicator 80, when the approach angle of the indicator 80 corresponding to the disposition of FIG. 9A is identified, the image display panel 50 and the optical sensor 20 are already facing a favorable direction, and the controller 30 may maintain the current orientation of the image display panel 50 and the optical sensor 20 without driving the rotating mechanism 70.

Meanwhile, when the approach angle of the indicator 80 corresponding to the disposition of FIG. 9B is identified, it is understood that the image display panel 50 and the optical sensor 20 are displaced from a favorable direction, and the controller 30, by driving the rotating mechanism 70, may rotate the image display panel 50 and the optical sensor 20 in the direction that reduces the displacement in the approach angle of the indicator 80.

With the aerial image interaction system 101, the operability of the user can be improved because the aerial image 62 and the virtual touch surface 42 are reoriented in a direction that makes it easier for the user to see and operate based on the displacement of the calibration boundary point 45 and the calibration point 46 (i.e., the approach angle of the indicator 80).

Above, a spatial coordinate identification device of the present invention is described based on embodiments, but the present invention is not limited to these embodiments. To the degree that they do not deviate from the essence of the present invention, various alternate shapes applied to the present embodiment as conceived of by a person skilled in the art, or shapes constructed by combining constituent elements of different embodiments, may be included in the scopes of one or more aspect of the present invention.

One or more embodiment of the invention can be used in a wide field as a user interface to interact with information equipment based on a virtual touch operation on an aerial image.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF THE REFERENCE NUMERALS 1 spatial coordinate identification device
10 detection light source
11 laser driver
12 infrared laser element
13 collimated lens
14 scan driver
15 actuator
16 mirror
17 detection light
18 reflected light
20 optical sensor
21 condensing lens
22 photoelectric convertor element
30 controller
31 CPU
32 RAM
33 ROM
34 virtual touch surface defining information
34a numerical table
34b numerical expression
40 detection region
41 detection boundary plane
42, 42a, 42b virtual touch surface
43 boundary point
45, 45a, 45b calibration boundary point
46 calibration point
50 image display panel
60 reflective element assembled substrate
61 image
62 aerial image
63 calibration icon
70 rotating mechanism
80 indicator
100, 101 aerial image interaction system

What is claimed is:

1. A spatial coordinate identification device, comprising:
an image display panel that displays an image;
a reflective element assembled substrate that projects the displayed image in a detection region as an aerial image;
a light source that emits a detection light that scans the detection region;
an optical sensor that detects a reflected light of the detection light reflected by an indicator;
a controller that
stores virtual touch surface defining information that defines a position of a virtual touch surface to be touched by the indicator, with respect to a detection boundary plane, and
identifies a position touched on the virtual touch surface by comparing an approach amount by which the indicator has entered the detection region based on the detection of the reflected light
with a distance from a boundary point that is an intersecting point of the indicator and the detection boundary plane to the virtual touch surface defined by the virtual touch surface defining information; and
a rotating mechanism that rotates the image display panel and the optical sensor with respect to a rotational axis on a flat surface comprising the reflective element assembled substrate.

2. The spatial coordinate identification device according to claim 1, wherein
the light source scans the detection boundary plane at a given timing using the detection light, and
when the optical sensor detects one or more detection pulses during a single scan of the detection boundary plane by the detection light, the controller identifies a position of the boundary point from the timing of a first or a last detection pulse of the detection pulses, and identifies the approach amount according to a number of detection pulses.

3. The spatial coordinate identification device according to claim 1, wherein
the virtual touch surface defining information comprises a numerical table indicating a position for each of a plurality of points on the virtual touch surface corresponding to each of a plurality of points on the detection boundary plane, respectively.

4. The spatial coordinate identification device according to claim 1, wherein
the virtual touch surface defining information comprises a numerical expression showing a position of a point on the virtual touch surface corresponding to any point on the detection boundary plane.

5. The spatial coordinate identification device according to claim 2, wherein
the virtual touch surface defining information comprises a numerical table indicating a position for each of a plurality of points on the virtual touch surface corresponding to each of a plurality of points on the detection boundary plane, respectively.

6. The spatial coordinate identification device according to claim 2, wherein
the virtual touch surface defining information comprises a numerical expression showing a position of a point on the virtual touch surface corresponding to any point on the detection boundary plane.

7. An aerial image interaction system, comprising:
an aerial image projection device comprising:
an image display panel that displays an image; and
a reflective element assembled substrate that projects the image displayed on the image display panel in a detection region as an aerial image;
a spatial coordinate identification device comprising:
a detection light source that emits a detection light that scans the detection region;

an optical sensor that detects a reflected light of the detection light reflected by an indicator; and a controller that stores virtual touch surface defining information that defines a position of a virtual touch surface to be touched by the indicator, with respect to a detection boundary plane, and identifies a position touched on the virtual touch surface by comparing an approach amount by which the indicator has entered the detection region based on the detection of the reflected light with a distance from a boundary point to the virtual touch surface defined by the virtual touch surface defining information; and a rotating mechanism that rotates the image display panel and the optical sensor with respect to a rotational axis on a flat surface comprising the reflective element assembled substrate;

wherein the controller holds information that represents a surface shape of the aerial image as the virtual touch surface defining information.

8. An aerial image interaction system according to claim 7, wherein when the surface shape of the aerial image changes, the controller changes the virtual touch surface defining information to represent the surface shape of the aerial image after the change.

9. An aerial image interaction system according to claim 7, wherein the controller displays a calibration icon at a given calibration point using the aerial image projection device;

identifies, when the indicator virtually touches the calibration icon, a position of a calibration boundary point defined as an intersecting point of the indicator and the detection boundary plane and a calibration amount defined as an amount by which the indicator has entered the detection region; and corrects the virtual touch surface defining information based on the position of the calibration boundary point and the calibration amount.

10. The aerial image interaction system according to claim 9, wherein the rotating mechanism rotates the image display panel and the optical sensor in mutually opposing directions around the rotational axis so that the detection boundary plane comes to a position symmetrical with the image display panel in relation to the reflective element assembled substrate, and wherein the controller detects an approach direction of the indicator into the detection region using a difference in the position of the calibration boundary point and a position of the calibration point, and rotates the image display panel and the optical sensor according to the detected approach direction.

11. A method for spatial coordinate identification executed in a spatial coordinate identification device, the method comprising:

displaying an image on an image display panel;

projecting, with a reflective element assembled substrate, the displayed image in a detection region as an aerial image;

emitting, with a light source, a detection light that scans the detection region;

detecting, with an optical sensor, a reflected light of the detection light reflected by an indicator;

storing virtual touch surface defining information that defines a position of a virtual touch surface to be touched by the indicator, with respect to a detection boundary plane;

identifying a position touched on the virtual touch surface by comparing an approach amount by which the indicator has entered the detection region based on the detection of the reflected light, with a distance from a boundary point that is an intersecting point of the indicator and the detection boundary plane to the virtual touch surface defined by the virtual touch surface defining information; and rotating, with a rotating mechanism, the image display panel and the optical sensor with respect to a rotational axis on a flat surface comprising the reflective element assembled substrate.

12. The method according to claim 11, further comprising:

scanning, with the light source, the detection boundary plane at a given timing using the detection light, and when the detecting detects one or more detection pulses during a single scan of the detection boundary plane by the detection light, identifying a position of the boundary point from the timing of a first or a last detection pulse of the detection pulses, and identifying the approach amount according to a number of detection pulses.

13. The method according to claim 11, wherein the virtual touch surface defining information comprises a numerical table indicating a position for each of a plurality of points on the virtual touch surface corresponding to each of a plurality of points on the detection boundary plane, respectively.

14. The method according to claim 11, wherein the virtual touch surface defining information comprises a numerical expression showing a position of a point on the virtual touch surface corresponding to any point on the detection boundary plane.

15. The method according to claim 12, wherein the virtual touch surface defining information comprises a numerical table indicating a position for each of a plurality of points on the virtual touch surface corresponding to each of a plurality of points on the detection boundary plane, respectively.

16. The method according to claim 12, wherein the virtual touch surface defining information comprises a numerical expression showing a position of a point on the virtual touch surface corresponding to any point on the detection boundary plane.

* * * * *